(12) United States Patent
Taylor et al.

(10) Patent No.: US 10,488,488 B2
(45) Date of Patent: Nov. 26, 2019

(54) SYSTEMS AND METHODS FOR ESTIMATING A GEOGRAPHICAL LOCATION OF AN UNMAPPED OBJECT WITHIN A DEFINED ENVIRONMENT

(71) Applicant: Walmart Apollo, LLC, Bentonville, AR (US)

(72) Inventors: Robert James Taylor, Rogers, AR (US); Nicholaus Adam Jones, Fayetteville, AR (US); Matthew Allen Jones, Bentonville, AR (US); Aaron James Vasgaard, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 131 days.

(21) Appl. No.: 15/478,628

(22) Filed: Apr. 4, 2017

(65) Prior Publication Data

US 2017/0285128 A1    Oct. 5, 2017

Related U.S. Application Data

(60) Provisional application No. 62/317,833, filed on Apr. 4, 2016.

(51) Int. Cl.
*G01S 5/02*      (2010.01)
*G06K 7/10*     (2006.01)
(Continued)

(52) U.S. Cl.
CPC .............. *G01S 5/0252* (2013.01); *G01S 5/02* (2013.01); *G01S 5/0294* (2013.01); *G01S 13/74* (2013.01);
(Continued)

(58) Field of Classification Search
CPC ........ G01S 5/0252; G01S 5/02; G01S 5/0294; G01S 13/74; G01S 19/13; G06K 7/10722; G06K 7/1413
(Continued)

(56) References Cited

U.S. PATENT DOCUMENTS 7,006,982 B2    2/2006  Sorensen
7,493,336 B2    2/2009  Noonan
(Continued)

FOREIGN PATENT DOCUMENTS

WO         1998038589 A1      9/1998
WO    WO 2016/130719 A2 *    2/2016    .............. G01C 21/32

OTHER PUBLICATIONS

Interntional Search Report and Written Opinion from related PCT application No. PCT/US20171025914 dated Jun. 19, 2017.

*Primary Examiner* — Mong-Thuy T Tran
(74) *Attorney, Agent, or Firm* — McCarter & English, LLP; David R. Burns

(57) ABSTRACT

Methods, systems, and non-transitory computer readable media are provided for rendering at an electronic terminal a first set of graphical user interfaces to request a first set of data from a user, receiving, at a central server in communication with the electronic terminal, the first set of data from the user, communicating the first set of data via a stateless edge appliance to a third party verification server in a selected one of a plurality of third party computer networks to validate the first set of data, rendering a second set of graphical user interfaces to request a second set of data from the user, communicating the second set of data to the third party verification server to authenticate the second set of data, and authenticating the user in response to receipt of authentication of the second set of data.

18 Claims, 7 Drawing Sheets

(51) Int. Cl.
*G06K 7/14* (2006.01)
*G01S 13/74* (2006.01)
*G01S 19/13* (2010.01)

(52) U.S. Cl.
CPC ....... *G06K 7/10722* (2013.01); *G06K 7/1413* (2013.01); *G01S 19/13* (2013.01)

(58) Field of Classification Search
USPC ..................................................... 455/456.1
See application file for complete search history.

(56) References Cited

U.S. PATENT DOCUMENTS

| | | | |
|---|---|---|---|
| 8,207,851 B2 | 6/2012 | Christopher | |
| 8,433,507 B2 | 4/2013 | Hannah et al. | |
| 8,651,389 B2 | 2/2014 | Shastri et al. | |
| 8,818,288 B2* | 8/2014 | Patwari | H04B 17/27 455/67.11 |
| 9,147,208 B1 | 9/2015 | Argue et al. | |
| 2006/0170591 A1 | 8/2006 | Houri | |
| 2008/0243378 A1* | 10/2008 | Zavoli | G01C 21/28 701/533 |
| 2008/0248815 A1* | 10/2008 | Busch | H04W 4/029 455/456.5 |
| 2009/0212921 A1* | 8/2009 | Wild | G01S 13/756 340/10.5 |
| 2009/0265106 A1* | 10/2009 | Bearman | G06Q 10/00 701/300 |
| 2009/0299788 A1* | 12/2009 | Huber | G06Q 20/1235 455/456.3 |
| 2010/0009713 A1* | 1/2010 | Freer | G06K 9/00979 455/556.1 |
| 2010/0201520 A1* | 8/2010 | Stern | G01S 13/75 340/572.1 |
| 2012/0019393 A1 | 1/2012 | Wolinsky et al. | |
| 2012/0239501 A1* | 9/2012 | Yankovich | G06Q 30/0235 705/14.58 |
| 2012/0239504 A1* | 9/2012 | Curlander | G06Q 30/02 705/14.66 |
| 2012/0290399 A1 | 11/2012 | England et al. | |
| 2012/0310968 A1* | 12/2012 | Tseng | G06F 16/5866 707/769 |
| 2013/0045751 A1* | 2/2013 | Chao | G01C 21/206 455/456.1 |
| 2013/0045753 A1* | 2/2013 | Obermeyer | G08B 21/0277 455/456.1 |
| 2013/0101163 A1* | 4/2013 | Gupta | G06K 9/00671 382/103 |
| 2013/0132241 A1 | 5/2013 | Sorensen | |
| 2014/0180572 A1 | 6/2014 | Acker, Jr. et al. | |
| 2015/0092061 A1* | 4/2015 | Chao | G06Q 30/00 348/158 |
| 2015/0235157 A1* | 8/2015 | Avegliano | G06Q 10/06315 705/7.25 |
| 2016/0033287 A1 | 2/2016 | High et al. | |
| 2016/0078264 A1* | 3/2016 | Armstrong | G08B 13/2417 340/572.1 |
| 2017/0228686 A1* | 8/2017 | Bermudez Rodriguez | G06Q 10/087 |

* cited by examiner

SYSTEMS AND METHODS FOR ESTIMATING A GEOGRAPHICAL LOCATION OF AN UNMAPPED OBJECT WITHIN A DEFINED ENVIRONMENT

CROSS-REFERENCE TO RELATED PATENT APPLICATIONS

This application claims priority to U.S. Provisional Application No. 62/317,833 filed on Apr. 4, 2016, the content of which is hereby incorporated by reference in its entirety.

BACKGROUND

Conventionally, location of unmapped objects within a defined environment can require traversal of the defined environment to observe a location of the unmapped object and manually document the observed location of the unmapped object. In some instances, sensor systems can be implemented such that unmapped objects can be detected, and in response to detection of the unmapped objects via the sensor system, the location of the unmapped objects can be determined. As one example, radio-frequency identification (RFID) tags can be secured to objects and RFID readers can be distributed throughout the defined environment to read the objects. When locations of objects having RFID tags are unmapped or otherwise unknown, the RFID readers can read the associated RFID tags and can determine the location of the objects based on which of the RFID readers reads the RFID tags.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
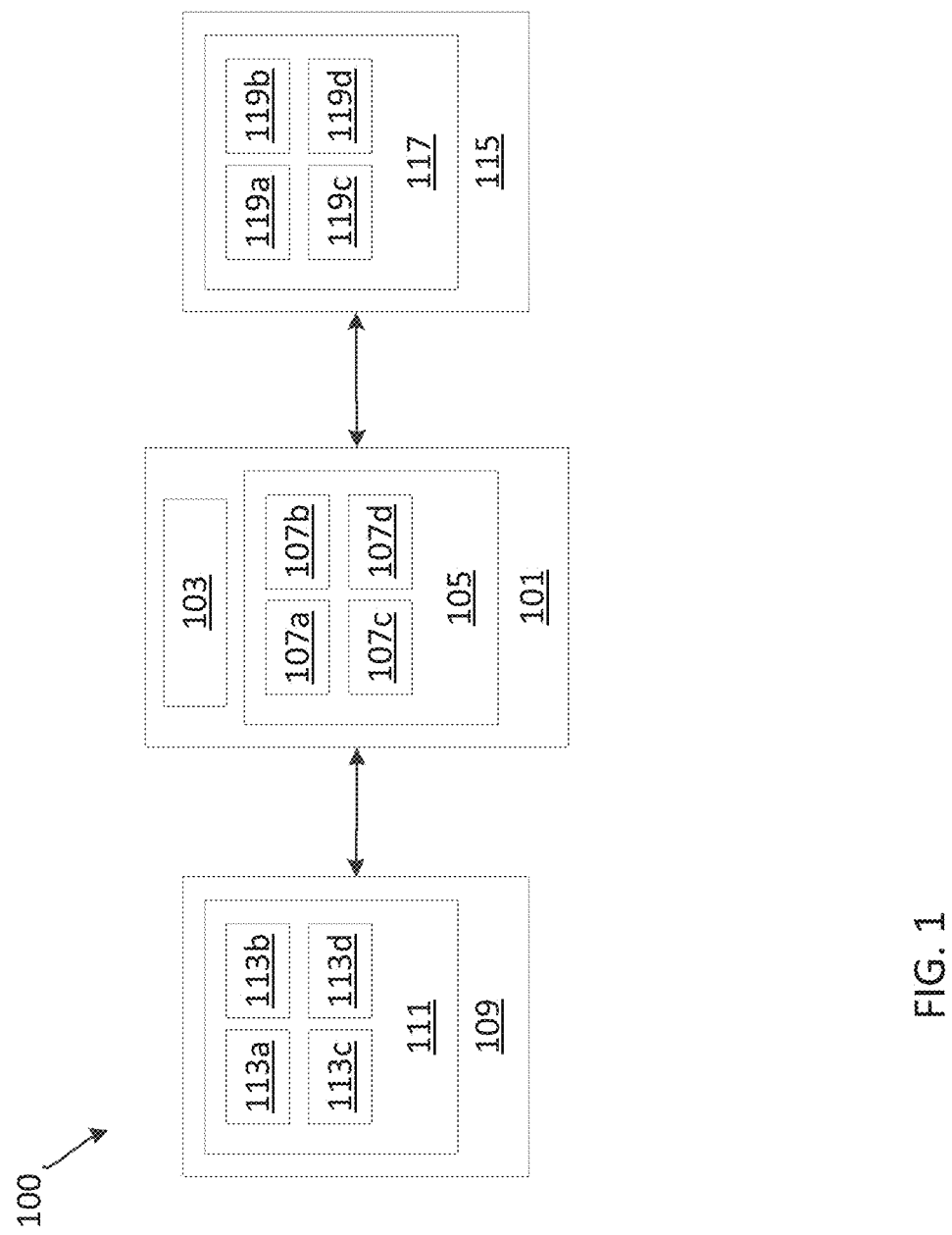
FIG. 1 is a block diagram illustrating a system for estimating a geographical location at which an unmapped object is disposed within a defined environment in accordance with various embodiments taught herein.

As discussed above, location of unmapped objects within a defined environment can require traversal of the defined environment and/or distributed sensor systems (e.g., RFID systems) to determine a location of the unmapped object in the defined environment. These approaches can be inefficient, impractical, and/or ineffective when addressing the problem of determining in situ locations of unmapped objects are in a defined environment, particularly when instances of such unmapped objects are being removed from their in situ locations over time and in some instances being removed from the defined environment.

Methods and systems are provided herein for estimating a geographical location at which an unmapped object is disposed within a defined environment. The methods and systems, in accordance with various embodiments, are configured to receive, at a central computing device from an activity database, a series of lists of objects associated with a series of completed collection actions, each of the series of lists of objects including an unmapped object and a plurality of mapped objects. The methods and systems, in accordance with various embodiments, are configured to retrieve, from an object mapping database in response to receiving the series of lists of objects, a series of sets of locations, each set of locations including a location within the defined environment of each of the plurality of mapped objects. The methods and systems, in accordance with various embodiments, are configured to determine, by a processor, based on the series of sets of locations, a plurality of estimated routes traversed through the defined environment to acquire each plurality of mapped objects corresponding to each of the series of lists of objects. The methods and systems, in accordance with various embodiments, are configured to detect, by the processor, at least one intersection point of the plurality of estimated routes at a geographic location within the defined environment. The methods and systems, in accordance with various embodiments, are configured to identify, by the processor, one of the at least one intersection points of the plurality of estimated routes as an unmapped object location within the defined environment.

In one embodiment, a mobile device can execute an application. In response to execution of the application a scanning module can be executed automatically. The scanning module can be configured to scan machine-readable elements associated with different objects. The machine-readable elements can be encoded with identifiers associated with the objects. The mobile device can transmit a decoded identifier from the machine-readable elements to the central computing system. The central computing system can determine the object corresponding to the received identifier. The central computing system can generate a list of objects based on the received identifiers and the corresponding objects. The central computing system can store the list in the activity database server. The order of the objects listed in each of the list of objects can be based on the order each of the objects were scanned by a mobile device. For example, a mobile device can scan the objects included in of objects in a particular order. The objects can be placed on the list at the time each object is scanned and accordingly the list of objects are in in the order each object was scanned. The central computing system can receive each scan and map a data point for the route as the central computing system receives the scan.

While some conventional solutions utilize distributed sensing systems for locating objects and/or for tracking devices associated with users that are collecting objects within the defined environment to ascertain specific (in situ) locations at which the unmapped object was collected, such solutions are generally expensive and technologically complex, invade the privacy of users collecting the objects, and can be unreliable because users often forget or refuse to register with a tracking service before commencing object collection. Exemplary embodiments of the present disclosure provides a solution to the problem that advantageously allows for estimating the geographic (in situ) locations of unmapped objects that can be implemented without a distributed sensing system without suffering from the above-identified disadvantages of conventional solutions.

Figure 3:
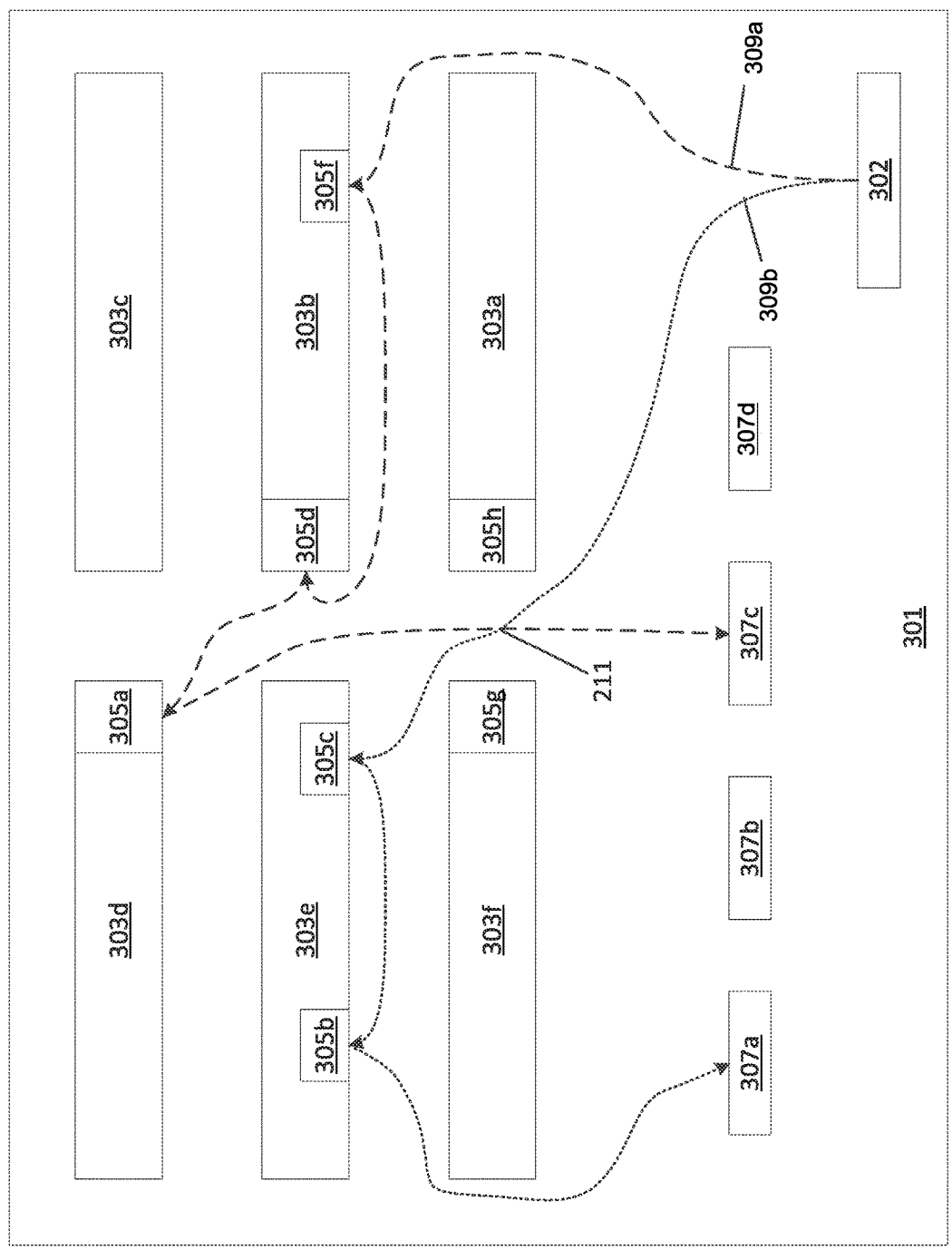
FIG. 3 is a floor plan diagram illustrating overlaid estimated routes for estimating a geographical location at which an unmapped object is disposed within a defined environment in accordance with various embodiments taught herein.

Referring now to FIG. 1, an exemplary system 100 for estimating a geographical location at which an unmapped object is/was disposed within a defined environment includes a central computing device 101 configured to receive or retrieve lists of objects 113a-d from an activity database 111 stored on an activity database server 109. Each of the lists of objects 113a-d includes an instance of a common unmapped object and at least two mapped objects. In response to receiving the lists of objects 113a-d, the central computing device 101 is configured to retrieve a corresponding set of locations 119a-d for each list of objects 113a-d from an object mapping database 117 stored on an object mapping database server 115. Each set of locations 119a-d includes a geographic location corresponding to each of the mapped objects in the corresponding list of objects 113a-d. The computing device 101 also includes a processor 103 and a memory 105. The processor 103 is configured to determine a corresponding estimated route 107a-d for each list of objects 113a-d and corresponding set of locations 119a-d. The estimated routes 107a-d can be stored in the memory 105 to permit the processor 103 to compare the estimated routes 107a-d to detect an intersection point (e.g., intersection point 311 as shown in FIG. 3) of the estimated routes 107a-d. The central computing device 101 can then identify the intersection point as the estimated geographic location of each of the instances of the common unmapped object (e.g., the geographic location at which instances of the common unmapped object are/were disposed).

The central computing device 101, in accordance with various embodiments, can include, for example, but is not limited to, any computational device including a workstation, desktop computer, server, laptop, handheld computer, tablet computer, mobile device, a smartphone, a cellular phone, a satellite phone, a tablet, a personal digital assistant (PDA), a laptop, a wireless barcode scanner, a handheld computing device, a point of sale (POS) terminal, an automated teller machine (ATM), a wearable device, or combinations thereof. Processor 103, in accordance with various embodiments can include, for example, but is not limited to, a microchip, a processor, a microprocessor, a special purpose processor, an application specific integrated circuit, a microcontroller, a field programmable gate array, combinations thereof, or any other device that is capable of processing data received by or stored on the central computing device 101. Memory 105, in accordance with various embodiments can include, for example, but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof. Memory 105, in accordance with various embodiments, can be configured to store one or more estimated routes 107a-d for use by the central computing system 101. The memory 105 can also, in accordance with various embodiments, include one or more software applications for operating the system 100. Each of the estimated routes 107a-d can be stored, in accordance with various embodiments, as a quantity of any renderable graphical mapping data, including, for example, x,y coordinate data points within the defined environment, a aisle/shelf locations, latitude-longitude coordinates, global positioning system (GPS) location data, any other suitable graphical mapping data, or combinations thereof.

The activity database server 109, in accordance with various embodiments, can include, for example, but is not limited to, any computational device including a workstation, desktop computer, server, laptop, handheld computer, tablet computer, mobile device, a smartphone, a cellular phone, a satellite phone, a tablet, a personal digital assistant (PDA), a laptop, a wireless barcode scanner, a handheld computing device, a point of sale (POS) terminal, an automated teller machine (ATM), a wearable device, or combinations thereof. The activity database 111 can include, for example, but is not limited to, any database including a key value database, a relational database, a cloud database, a centralized database, a mobile database, a distributed database, any other type of database capable of storing lists of objects 113a-d, or combinations thereof. The lists of objects 113a-d can each include object identifying information corresponding to each of a plurality of objects. Object identifying information, in accordance with various embodiments, can include a written description of the item, a pictorial representation of the object, a stock keeping unit, a barcode, a one-dimensional barcode, a two-dimensional barcode, a UPC code, an EAN code, a Code 39, a Code 93, Code 128, an ITF, a codabar, a GS1 databar, an MSI Plessey, a QR code, a Datamatrix code, a PDF417, or an Aztec associated with the object. In accordance with various embodiments, the objects of the list of objects 113a-d can be listed in a randomized order or in a particular order (e.g., an order in which the objects were scanned at a point of sale (POS) terminal).

The object mapping database server 115, in accordance with various embodiments, can include, for example, but is not limited to, any computational device including a workstation, desktop computer, server, laptop, handheld computer, tablet computer, mobile device, a smartphone, a cellular phone, a satellite phone, a tablet, a personal digital assistant (PDA), a laptop, a wireless barcode scanner, a handheld computing device, a point of sale (POS) terminal, an automated teller machine (ATM), a wearable device, or combinations thereof. The object mapping database 117 can include, for example, but is not limited to, any database including a key value database, a relational database, a cloud database, a centralized database, a mobile database, a distributed database, any other type of database capable of storing sets of locations 119a-d, or combinations thereof. Each of the sets of locations 119a-d can be stored, in accordance with various embodiments, in any location data format, including, for example, x,y coordinate data points within the defined environment, a aisle/shelf locations, latitude-longitude coordinates, global positioning system (GPS) location coordinates, any other suitable location data, or combinations thereof.

In use, the system 100 can be configured to receive, at the central computing device 101, a plurality of lists of objects 113a-d from the activity database 111 stored on the activity database server 109. Each list of objects 113a-d can include identification data corresponding to each of a number of objects that are disposed within the defined environment. The number of objects can include both mapped objects (e.g., 305a-g of FIG. 3) and one or more common unmapped objects (e.g., 305*h* of FIG. 3). In accordance with various embodiments, the mapped objects are objects having corresponding (in situ) location data stored in the object mapping database 117 and unmapped objects are objects having no corresponding (in situ) location data stored in the object mapping database 117. As such, the locations at which mapped objects are/were supposed to be disposed can be known by the system 100, while the locations at which the unmapped objects are/were supposed to be disposed can be unknown to the system. In response to receiving the lists of objects 113*a-d*, the central computer 101 can transmit the lists of objects 113*a-d* to the object mapping database server 115 and retrieve a corresponding set of locations 119*a-d* for each list of objects 113*a-d* from the object mapping database 117 stored on the object mapping database server 115. Each set of locations 119*a-d* includes location data corresponding to each of the mapped objects of the corresponding list of objects 113*a-d*.

Each list of objects 113*a-d* and corresponding set of locations 119*a-d* can, in accordance with various embodiments, be analyzed by the processor 103 of the central computing device 101 to determine a corresponding estimated route 107*a-d* through the defined environment taken to collect the mapped objects of each list of objects 113*a-d*. The processor 103 can then be used to compare or overlay each of the estimated routes 107*a-d* to detect a common intersection point (e.g., intersection point 211 of first and second estimated routes 309*a*, 309*b* of FIG. 3) between each of the estimated routes 107*a-d*. The system 100 can then identify the intersection point(s) as the estimated geographic location at which the unmapped object(s) are/were disposed within the defined environment. Thus, accurate object locations can advantageously be ascertained without a need for privacy-invasive user tracking or expensive, complex sensing systems.

In accordance with various embodiments, the estimated routes 107*a-d* can be refined based on additional contextual information. For example, in accordance with various embodiments, an order of the objects listed in each list of objects 113*a-d* can be used to refine the estimated routes 107*a-d* based on an assumption that, in general, the objects were scanned on a last in first out (LIFO) basis (i.e., the first object(s) collected is/are the last object(s) to be scanned). This context can be used, for example, to clarify a correct mapped location for ambiguously located objects that can be positioned at two or more different locations within the defined environment by identifying other objects that were scanned (and thus presumptively collected) in proximity to the ambiguously located object.

Contextual information, in accordance with various embodiments, can also include generalized sensor data. For example, an estimated collection time associated with the estimated route 107*a-d* can be generated. The system 100 can then check sensors (e.g., motion sensors of a security system) within the defined environment to verify that movement or activity occurred along the estimated route 107*a-d* within the estimated collection time. If not, the system 100 can recalculate the estimated route 107*a-d* and recheck the new route against the sensor data. However, the user's privacy is protected because the generalized sensor data merely confirms that motion occurred at an appropriate time and location within the defined environment without identifying and specifically tracking the individual user/collector traversing the defined environment.

Figure 2:
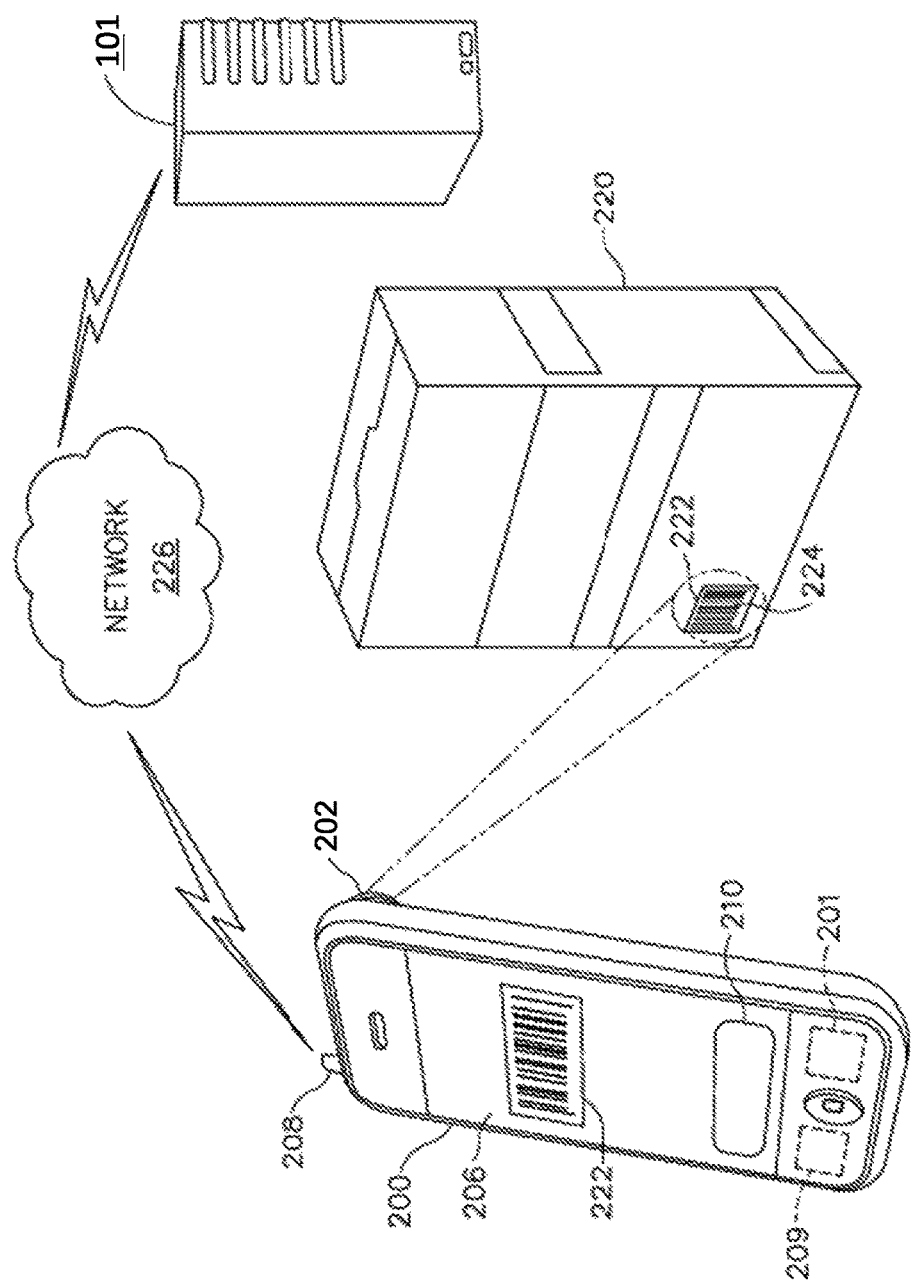
FIG. 2 depicts an illustration of a mobile device receiving identification information from an item and communicating with a remote server, in accordance with one embodiment of the present invention.

With reference to FIG. 2, illustrated is an exemplary representation of a mobile device 200 for scanning objects 220 from at a retail establishment. Mobile device 200 is portable electronic device having a processor 201 for executing applications and a display 206 for displaying information connected with the processor 201, and includes such devices as a personal desktop assistant (PDA), a portable computer, a mobile telephone, a smartphone, a netbook, and a tablet computer. Display 206 can use any of a variety of types of display technologies, such as a liquid crystal display (LCD), a cathode-ray tube type display, an electronic ink display, a light emitting diode (LED) type display such as an OLED display, and a plasma display. Preferably, the mobile device 200 also includes a communications device 208 and a scanning module 202. The communications device 208 is connected with the processor 201 and capable of sending and receiving information between one or more other computers connected with the mobile device 200. Preferably, communications device 208 is capable of wirelessly transmitting signals to another computer, such as computing system 101, using a radio transmitter and a radio receiver connected with an antenna. The scanning module 202 is capable of receiving identification information 222 from an object 220 and converting the identification information 222 into a format that the processor 201 can read, such as digital data. Preferably, Scanning module 202 includes any device which can capture, receive and process optical information, such as a barcode or any image, and includes devices such as a digital scanner, a digital camera, a video camera, a barcode reader, and any other type of digital or analog imaging device.

Preferably, communications device 208 communicates with another computer 100, such as computing system 101, via a network 226 using a network interface 209. Network interface 209 is connected with processor 201 and communications device 208, and preferably disposed within remote device 200.

Network 226 may include any type of network that is capable of sending and receiving communication signals, including signals for multimedia content, images, data and streaming video. Network 226 may include a data network, such as the Internet, an intranet, a local area network (LAN), a wide area network (WAN), a cable network, and other like systems that are capable of transmitting information, such as digital data, and the like. Network 226 may also include a telecommunications network, such as a local telephone network, long distance telephone network, cellular telephone network, satellite communications network, cable television network and other like communications systems that interact with computer systems to enable transmission of information between mobile device 200 and another computer such as computing system 101. Network 226 may include more than one network and may include a plurality of different types of networks. Thus, network 226 may include a plurality of data networks, a plurality of telecommunications networks, cable systems, satellite systems and/or a combination of data and telecommunications networks and other like communication systems.

Network 226 is connected with both mobile device 200 and computing system 101 and allows for information to be transmitted and shared between mobile device 200 and computing system 101. Computing system 101 includes any type of computer which can receive, store, process, and transmit information to another computer and includes devices such as a server based computer system capable of interacting with one or more other computer systems.

In one embodiment, mobile device 200 includes location information processing means which allows the mobile device 200 to determine its location. Location information processing means includes devices such a Global Positioning System (GPS) based device, and methods such as using radio triangulation to determine the location of the mobile device 200. Preferably, mobile device 200 includes input means 210 for entering information from a user into the mobile device 200. Input means includes any device which can assist a user to enter information, such as a keyboard, a mouse, a touchpad, a touchscreen, a joystick, a button, and a dial.

Object 220 includes any object or service which is being sold by a retailer. Preferably, the object 220 is located with a retail establishment or store. Object 220 includes object identification information 222 which is any information on the object 220 which assists in identifying the object 220 such as a machine-readable element 224. The machine-readable element 224 can be a barcode or a QR code. The identifying information can also include a serial number, a name of the object 220, and any text, characters, illustrations, or images on the object 220 which can be used to identify the object 220.

In one embodiment, the mobile device 200 can execute an application. In response to execution of the application the scanning module can be executed automatically. As described above, the scanning module can be configured to scan machine-readable elements associated with different objects. The machine-readable elements can be encoded with identifiers associated with the objects. The mobile device 200 can transmit a decoded identifier from the machine-readable elements to the central computing system 101. The central computing system 101 can determine the object corresponding to the received identifier. The central computing system 101 can generate a list of objects based on the received identifiers and the corresponding objects. The central computing system 101 can store the list in the activity database server (e.g. activity database server 109 as shown in FIG. 1). The order of the objects listed in each of the list of objects 113*a-d* (as shown in FIG. 1) can be based on the order each of the objects were scanned by a mobile device 200. For example, a mobile device can scan the objects included in of objects in a particular order. The objects can be placed on the list 113*a-d* at the time each object is scanned and accordingly the list of objects are in in the order each object was scanned. The central computing system 101 can receive each scan and map a data point for the route as the central computing system 101 receives the scan.

Referring now to FIG. 3, by way of non-limiting example, in one application of the technology described herein, a system (e.g., the system 100 of FIG. 1), in accordance with various embodiments, can be used for locating unmapped products within a defined environment 301 (e.g., a retail store as shown) having a plurality aisle displays 303*a-f*. The location can be determined as an intersection point 311 of estimated routes 309*a*, 309*b* estimated from lists of objects scanned at an activity database server (e.g., a point of sale POS terminal 307*a-d* as shown in FIG. 3) and/or scanned at by the mobile device (e.g. as shown in FIG. 2) and associated with discrete transactions. Although the example embodiment shown in FIG. 3 illustrates a retail store application in accordance with various embodiments, it will be appreciated in view of this disclosure that, in accordance with various embodiments, the subject patent application can be used in any other suitable environment such as, for example, a warehouse, an industrial complex, a factory, or any other defined environment.

As shown in FIG. 3, first and second users each enter the defined environment 301 via entrance 302, collect various objects/products 305*a-h* while shopping, and check out at a POS terminal 307*a-d*. In particular, the first user collects objects 205*a*, 205*d*, 205*f*, and 205*h*, removing the objects 305*a*, 305*d*, 305*f*, and 305*h* from their in situ locations (e.g., original or resting locations at which each of the objects are disposed in the defined environment), and checks out at POS terminal 307*c*. The second user collects objects 305*b*, 305*c*, and 305*h*, removing the objects 305*b*, 305*c*, and 305*h* from their in situ locations, and checks out at POS terminal 307*a*. The system of FIG. 3 then acquires (e.g., by central computing device 101) the POS transaction data (e.g., the list of scanned objects for each transaction) from POS terminals 307*a* and 307*c* for each transaction (and/or list of scanned objects by the mobile device 200 described in FIG. 2). The system then retrieves (e.g., by central computing device 101) mapped locations for each of objects 305*a-f* from the object mapping database (e.g., object mapping database 117 stored on object mapping database server 115) and detects common unmapped object 305*h*. In exemplary embodiments, because the users' locations are not tracked as they move through the defined environment 301, the system (e.g., system 100) does not know the exact routes that the users followed through the defined environment 301. Additionally, because the users remove the objects from their respective in situ locations, the system can assume that the objects were removed from the locations corresponding to the mapped locations stored in the object mapping database. The system retroactively determines (e.g., by the processor 103 of the central computing device 101) estimated routes 309*a* and 309*b* that the users followed to collect the objects for each transaction list of objects based the transaction list of objects and the retrieved mapped locations for the mapped objects in the transaction list of objects. Because intersection point 311 is the only intersection point between routes 309*a* and 309*b*, the system (e.g., by the processor 103 of the central computing device 101) can identify the intersection point 311 as the location of unmapped object 305*h*.

As shown in FIG. 3, the intersection point 311 corresponds to two opposing end caps of aisle displays 303*f* and 303*a* within the defined environment 301. In order to clarify the location of the unmapped object 305*h*, the system can retrieve (e.g., from object mapping database 117 stored on object mapping database server 115) a list of any products mapped to one of the corresponding end caps of aisle displays 303*f* and 303*a*. As shown in FIG. 2, the end cap of aisle display 303*f* is associated with mapped object 305*g*. Therefore, the system can positively identify the end cap of aisle display 203*a* as the location of unmapped object 305*h*.

Figure 4:
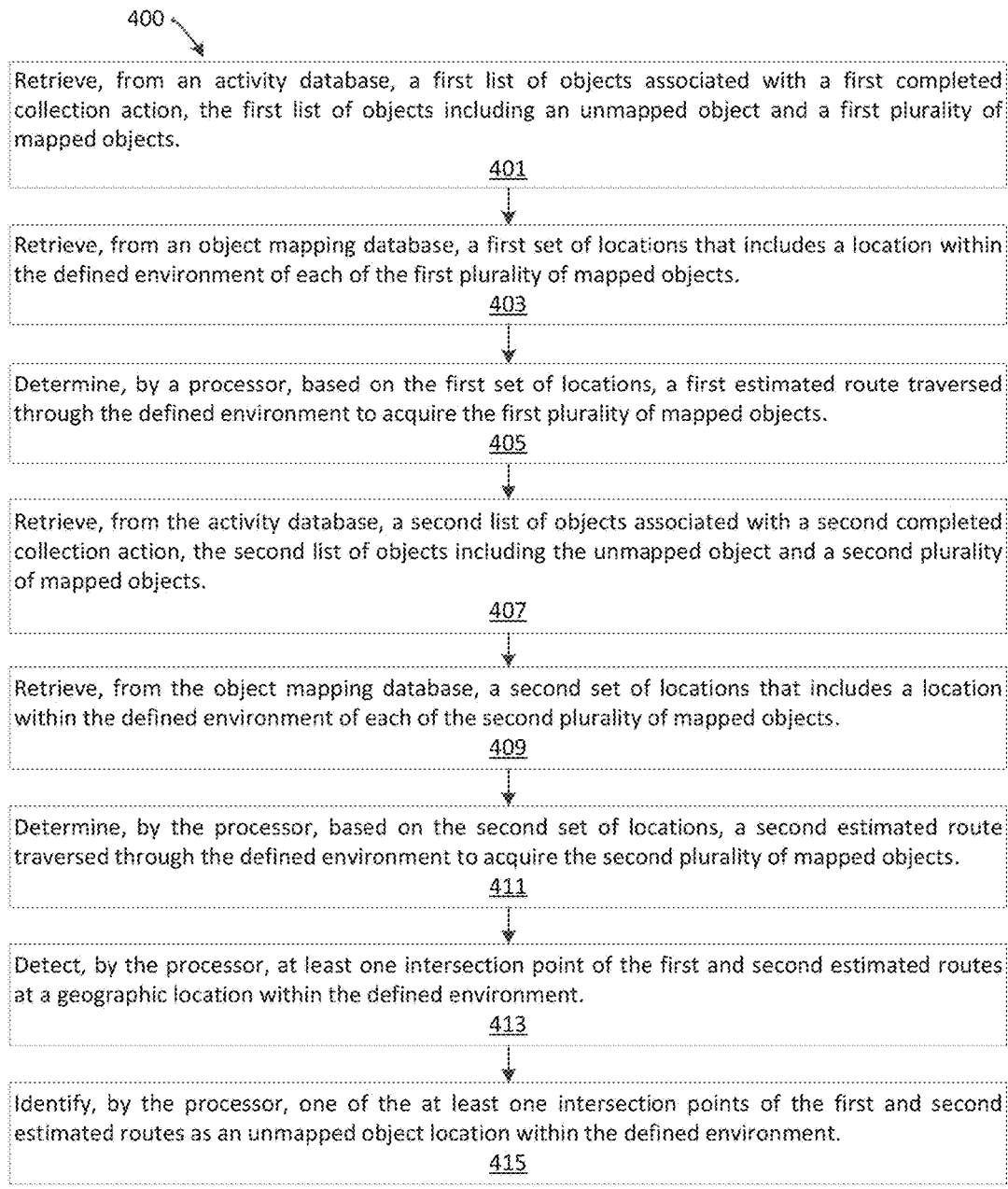
FIG. 4 is a flow diagram illustrating a method for estimating a geographical location at which an unmapped object is disposed within a defined environment in accordance with various embodiments taught herein.

Referring now to FIG. 4, a method 400 is provided. The method includes a step 401 of retrieving, from an activity database, a first list of objects associated with a first completed collection action, the first list of objects including an unmapped object and a first plurality of mapped objects. The method also includes a step 403 of retrieving, from an object mapping database, a first set of locations that includes a location within the defined environment of each of the first plurality of mapped objects. At step 405, the method includes determining, by a processor, based on the first set of locations, a first estimated route traversed through the defined environment to acquire the first plurality of mapped objects. At step 407, the method includes retrieving, from the activity database, a second list of objects associated with a second completed collection action, the second list of objects including the unmapped object and a second plurality of mapped objects. At step 409, the method includes retrieving, from the object mapping database, a second set of locations that includes a location within the defined environment of each of the second plurality of mapped objects.

At step 411, the method includes determining, by the processor, based on the second set of locations, a second estimated route traversed through the defined environment to acquire the second plurality of mapped objects. At step 413, the method includes detecting, by the processor, at least one intersection point of the first and second estimated routes at a geographic location within the defined environment. At step 415, the method includes identifying, by the processor, one of the at least one intersection points of the first and second estimated routes as an unmapped object location within the defined environment.

The step 401 of retrieving, from an activity database, a first list of objects associated with a first completed collection action, the first list of objects including an unmapped object and a first plurality of mapped objects can be performed, for example but not limited to, using the central computing device 101 to retrieve a plurality of lists of objects 113a-d from an activity database 111 stored on an activity database server 109 as described above with reference to FIG. 1. The step 403 of retrieving, from an object mapping database, a first set of locations that includes a location within the defined environment of each of the first plurality of mapped objects can be performed, for example but not limited to, using the central computing device 101 to retrieve a plurality of sets of locations 119a-d from an object mapping database 117 stored on an object mapping database server 115 as described above with reference to FIG. 1. The step 305 of determining, by a processor, based on the first set of locations, a first estimated route traversed through the defined environment to acquire the first plurality of mapped objects can be performed, for example but not limited to, using the processor 103 of the central computing device 101 to determine a plurality of estimated routes 107a-d.

The step 407 of retrieving, from the activity database, a second list of objects associated with a second completed collection action, the second list of objects including the unmapped object and a second plurality of mapped objects can be performed, for example but not limited to, by using the central computing device 101 to retrieve a plurality of lists of objects 113a-d from an activity database 111 stored on an activity database server 109 as described above with reference to FIG. 1. The step 409 of retrieving, from the object mapping database, a second set of locations that includes a location within the defined environment of each of the second plurality of mapped objects can be performed, for example but not limited to, using the central computing device 101 to retrieve a plurality of sets of locations 119a-d from an object mapping database 117 stored on an object mapping database server 115 as described above with reference to FIG. 1. The step 411 of determining, by the processor, based on the second set of locations, a second estimated route traversed through the defined environment to acquire the second plurality of mapped objects can be performed, for example but not limited to, using the processor 103 of the central computing device 101 to determine a plurality of estimated routes 107a-d, 209a, 209b as described above with reference to FIGS. 1 and 3.

The step 413 of detecting, by the processor, at least one intersection point of the first and second estimated routes at a geographic location within the defined environment can be performed, for example but not limited to, using the processor 103 of the central computing device 101 to detect an intersection 311 of the estimated routes 107a-d, 209a, 209b as described above with reference to FIGS. 1 and 3. The step 415 of identifying, by the processor, one of the at least one intersection points of the first and second estimated routes as an unmapped object location within the defined environment can be performed, for example but not limited to, using the processor 103 of the central computing device 101 to identify one of the at least one intersection points 211 as the unmapped object location as described above with reference to FIGS. 1 and 3.

Figure 5:
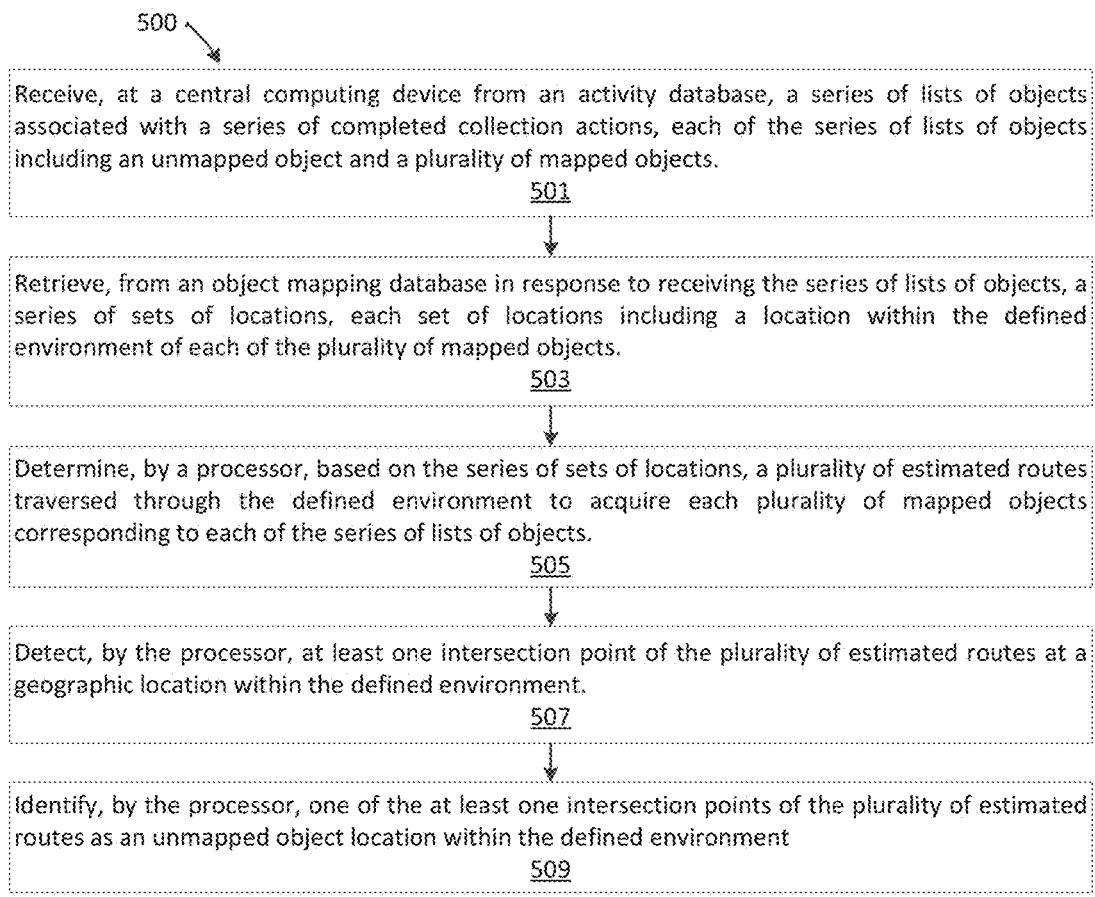
FIG. 5 is a flow diagram illustrating an alternative method for estimating a geographical location at which an unmapped object is disposed within a defined environment in accordance with various embodiments taught herein.

Referring now to FIG. 5, a method 500 is provided. The method includes a step 501 of receiving, at a central computing device from an activity database, a series of lists of objects associated with a series of completed collection actions, each of the series of lists of objects including an unmapped object and a plurality of mapped objects. The method also includes a step 503 of retrieving, from an object mapping database in response to receiving the series of lists of objects, a series of sets of locations, each set of locations including a location within the defined environment of each of the plurality of mapped objects. At step 505, the method includes determining, by a processor, based on the series of sets of locations, a plurality of estimated routes traversed through the defined environment to acquire each plurality of mapped objects corresponding to each of the series of lists of objects. At step 507, the method includes detecting, by the processor, at least one intersection point of the plurality of estimated routes at a geographic location within the defined environment. At step 509, the method includes identifying, by the processor, one of the at least one intersection points of the plurality of estimated routes as an unmapped object location within the defined environment.

The step 501 of receiving, at a central computing device from an activity database, a series of lists of objects associated with a series of completed collection actions, each of the series of lists of objects including an unmapped object and a plurality of mapped objects can be performed, for example but not limited to, using the central computing device 101 to retrieve a plurality of lists of objects 113a-d from an activity database 111 stored on an activity database server 109 as described above with reference to FIG. 1. The step 503 of retrieving, from an object mapping database in response to receiving the series of lists of objects, a series of sets of locations, each set of locations including a location within the defined environment of each of the plurality of mapped objects can be performed, for example but not limited to, using the central computing device 101 to retrieve a plurality of sets of locations 119a-d from an object mapping database 117 stored on an object mapping database server 115 as described above with reference to FIG. 1. The step 505 of determining, by a processor, based on the series of sets of locations, a plurality of estimated routes traversed through the defined environment to acquire each plurality of mapped objects corresponding to each of the series of lists of objects can be performed, for example but not limited to, using the processor 103 of the central computing device 101 to determine a plurality of estimated routes 107a-d, 209a, 209b as described above with reference to FIGS. 1 and 3.

The step 507 of detecting, by the processor, at least one intersection point of the plurality of estimated routes at a geographic location within the defined environment can be performed, for example but not limited to, by using the processor 103 of the central computing device 101 to detect an intersection 311 of the estimated routes 107a-d, 309a, 309b as described above with reference to FIGS. 1 and 2. The step 509 of identifying, by the processor, one of the at least one intersection points of the plurality of estimated routes as an unmapped object location within the defined environment can be performed, for example but not limited to, using the processor 103 of the central computing device 101 to identify one of the at least one intersection points 311 as the unmapped object location as described above with reference to FIGS. 1 and 3.

Exemplary Computing Devices

Figure 6:
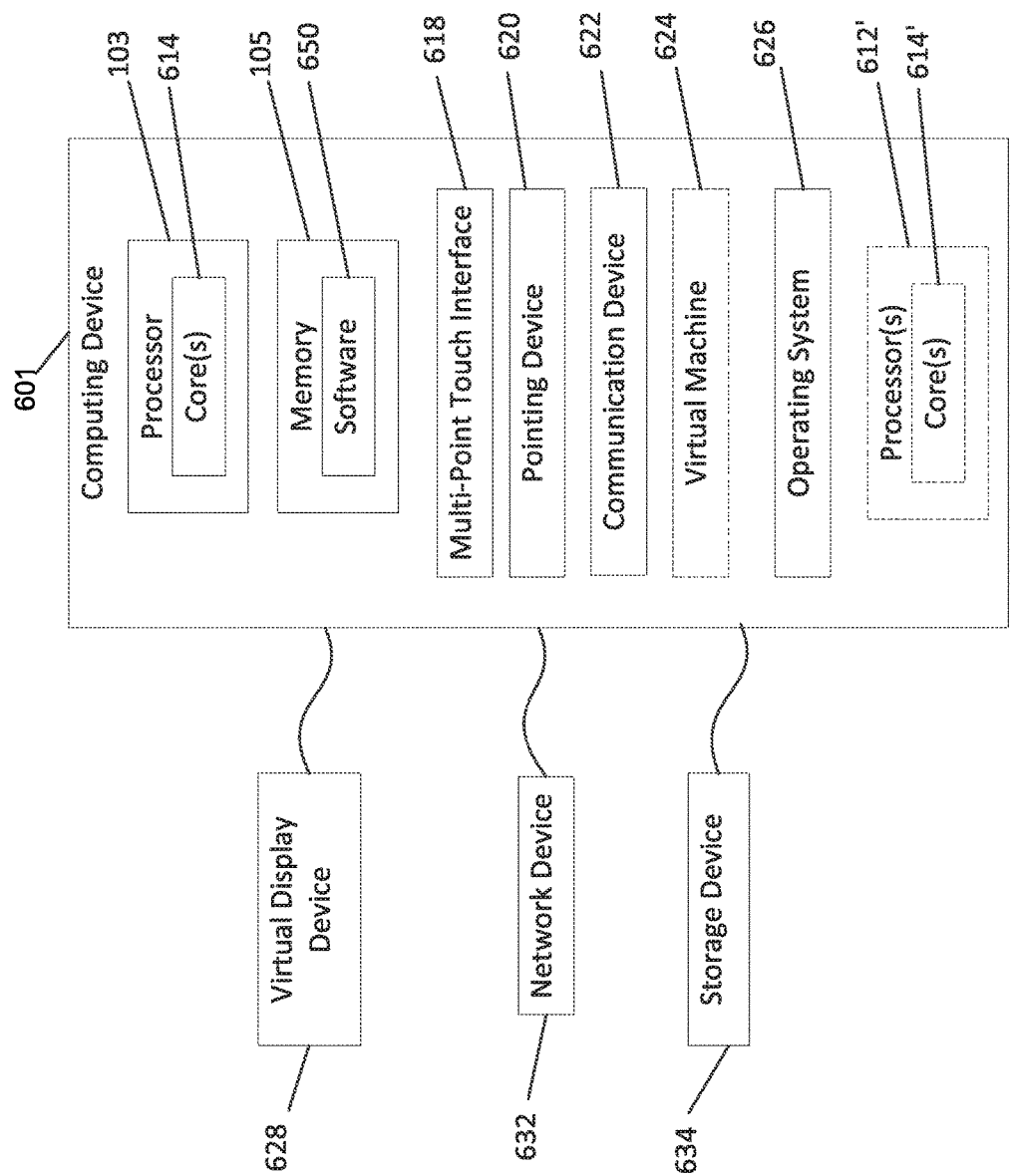
FIG. 6 is an example computational device block diagram depicting various components which can be used to implement various embodiments taught herein.

FIG. 6 is a block diagram of an exemplary computing device 601 such as can be used, or portions thereof, in accordance with various embodiments and, for clarity, refers back to and provides greater detail regarding various elements of the system 100 of FIG. 1. The computing device 601 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 105 included in the computing device 601 can store computer-readable and computer-executable instructions or software for performing the operations disclosed herein. For example, the memory 105 can store a software application 650 which is configured to perform various of the disclosed operations (e.g., using processor 103 to determine a plurality of estimated routes 107a-d, detect an intersection point of the plurality of estimated routes 107a-d, and identify the intersection point as an unmapped object location within the defined environment). The computing device 601 can also include configurable and/or programmable processor 103 and an associated core 614, and optionally, one or more additional configurable and/or programmable processing devices, e.g., processor(s) 612' and associated core(s) 614' (for example, in the case of computational devices having multiple processors/cores), for executing computer-readable and computer-executable instructions or software stored in the memory 105 and other programs for controlling system hardware. Processor 103 and processor(s) 612' can each be a single core processor or multiple core (614 and 614') processor.

Virtualization can be employed in the computing device 601 so that infrastructure and resources in the computing device can be shared dynamically. A virtual machine 624 can be provided to handle a process running on multiple processors so that the process appears to be using only one computing resource rather than multiple computing resources. Multiple virtual machines can also be used with one processor.

Memory 105 can include a computational device memory or random access memory, such as DRAM, SRAM, EDO RAM, and the like. Memory 105 can include other types of memory as well, or combinations thereof.

A user can interact with the computing device 601 through a visual display device 628, such as a computer monitor. The computing device 601 can include other I/O devices for receiving input from a user, for example, a keyboard or any suitable multi-point touch interface 618, a pointing device 620 (e.g., a mouse). The keyboard 518 and the pointing device 620 can be coupled to the visual display device 628. The computing device 601 can include other suitable conventional I/O peripherals.

The computing device 601 can also include one or more storage devices 634, such as a hard-drive, CD-ROM, or other computer readable media, for storing data and computer-readable instructions and/or software that perform operations disclosed herein. Exemplary storage device 534 can also store one or more databases for storing any suitable information required to implement exemplary embodiments. The databases can be updated manually or automatically at any suitable time to add, delete, and/or update one or more items in the databases.

The computing device 601 can include a communication device 622 configured to interface via one or more network devices 632 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The communication device 622 can include a built-in network adapter, network interface card, PCMCIA network card, card bus network adapter, wireless network adapter, USB network adapter, modem, radio frequency transceiver, or any other device suitable for interfacing the computing device 601 to any type of network capable of communication and performing the operations described herein. Moreover, the computing device 601 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 601 can run any operating system 626, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 626 can be run in native mode or emulated mode. In an exemplary embodiment, the operating system 626 can be run on one or more cloud machine instances.

Figure 7:
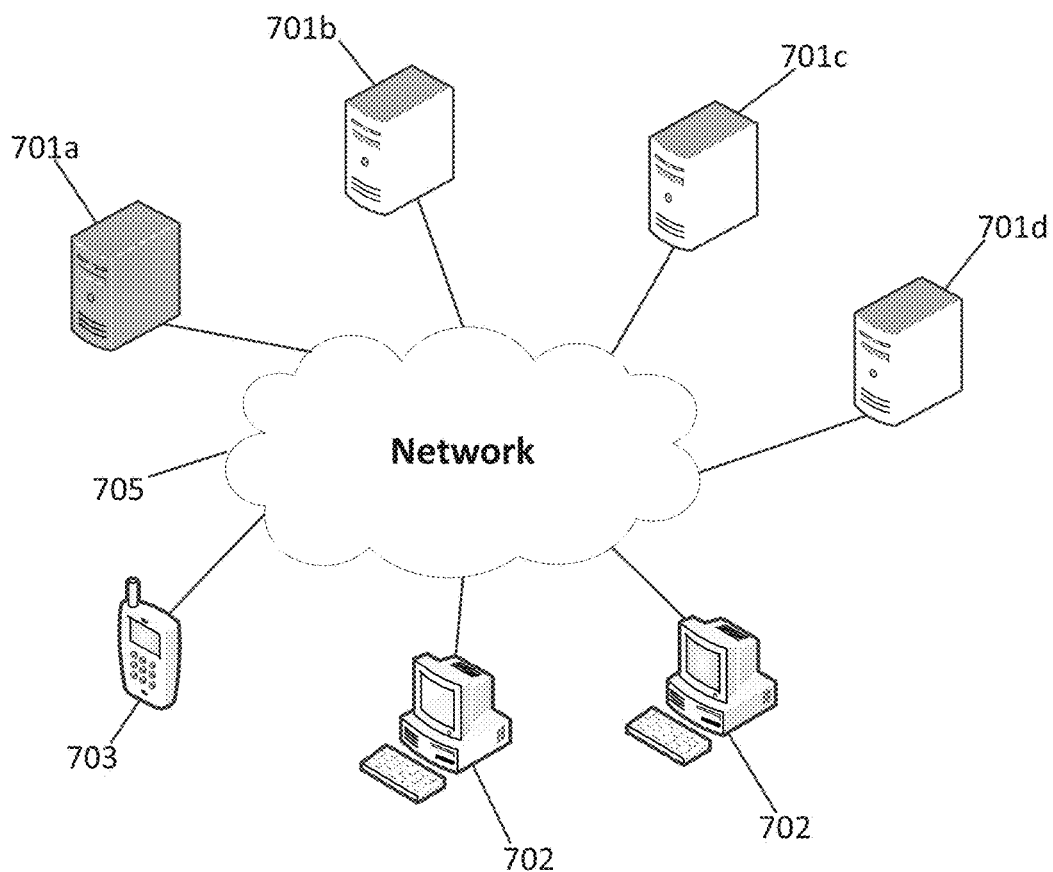
FIG. 7 is an example computational device block diagram depicting various components which can be used to implement various embodiments taught herein in a distributed system.

FIG. 7 is an example computational device block diagram of certain distributed embodiments. Although FIG. 1, and portions of the exemplary discussion above, make reference to centralized systems 100 operating on one or more single computing devices, one will recognize that various of the modules within the system 100 may instead be distributed across a network 705 in separate server systems 701a-d and possibly in user systems, such as a desktop computer device 702, or mobile computer device 703. As one example, users may download an application to their desktop computer device or mobile computer device, which is configured to run the system 100. As another example, the central computing device 101 can render a client side application of a client-server environment, wherein the system 100 is hosted by a server and interacted with by the desktop computer device or mobile device. In some distributed systems, various modules or components of the system 100 can be separately located on server systems 701a-d and can be in communication with one another across the network 705.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step.

Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for estimating a geographic location at which an unmapped object is disposed within a defined environment comprising:
   retrieving, from an activity database, a first list of objects associated with a first completed collection action, the first list of objects including the unmapped object and a first plurality of mapped objects;
   retrieving, from an object mapping database, a first set of locations that includes a location within the defined environment of each of the first plurality of mapped objects;
   determining, by a processor, based on the first set of locations, a first estimated route traversed through the defined environment to acquire the first plurality of mapped objects;
   retrieving, from the activity database, a second list of objects associated with a second completed collection action, the second list of objects including the unmapped object and a second plurality of mapped objects;
   retrieving, from the object mapping database, a second set of locations that includes a location within the defined environment of each of the second plurality of mapped objects;
   determining, by the processor, based on the second set of locations, a second estimated route traversed through the defined environment to acquire the second plurality of mapped objects;
   detecting, by the processor, at least one intersection point of the first and second estimated routes at the geographic location within the defined environment; and
   identifying, by the processor, one of the at least one intersection points of the first and second estimated routes as an unmapped object location within the defined environment,
   wherein the first list of objects indicates an order of collection of the first list of objects, the determination of the first estimated route is further based on the order of collection of the first list of objects, the second list of objects indicates an order of collection of the second list of objects, and the determination of the second estimated route is further based on the order of collection of the second list of objects,
   detecting an indication of an incoherent route associated with at least one of the first estimated route, the second estimated route, or a third estimated route, the third estimated route being associated with a third list of objects that includes the unmapped object and a third plurality of mapped objects; and
   excluding the at least one of the first estimated route, the second estimated route, or the third estimated route associated with the indication of the incoherent route from the detection of the at least one intersection point.

2. The method of claim 1, further comprising:
   retrieving, from the activity database, a third list of objects associated with a third completed collection action, the third list of objects including the unmapped object and a third plurality of mapped objects;
   retrieving, from the object mapping database, a third set of locations that includes a location within the defined environment of each of the third plurality of mapped objects;
   determining, by the processor, based on the third set of locations, a third estimated route traversed through the defined environment to acquire the third plurality of mapped objects;
   detecting, by the processor, at least one intersection point of the first, second, and third estimated routes at the geographic location within the defined environment; and
   identifying, by the processor, one of the at least one intersection points of the first, second, and third estimated routes as an unmapped object location within the defined environment.

3. The method of claim 1, further comprising associating the unmapped object location with the unmapped object in the object mapping database.

4. The method of claim 1, wherein the activity database is coupled to one or more mobile devices, each mobile device including a scanning module and executing an application.

5. The method of claim 4, further comprising:
   scanning, via each of the scanning modules of the one or more mobile devices, machine-readable elements encoded with identifiers associated with the objects in the first, second or third list of objects; and
   receiving, via each of the applications executed on the one or more mobile devices, decoded identifiers associated with the objects in the first, second or third list of objects.

6. The method of claim 2, wherein the first list of objects indicates an order of collection of the first list of objects;
   wherein the determination of the first estimated route is further based on the order of collection of the first list of objects;
   wherein the second list of objects indicates an order of collection of the second list of objects;
   wherein the determination of the second estimated route is further based on the order of collection of the second list of objects;
   wherein the third list of objects indicates an order of collection of the third list of objects; and
   wherein the determination of the third estimated route is further based on the order of collection of the third list of objects.

7. The method of claim 1, wherein the determination of at least one of the first estimated route or the second estimated route is further based on previously recorded sensor data acquired by a plurality of sensors distributed within the defined environment.

8. A method for estimating a geographic location at which an unmapped object is disposed within a defined environment comprising:
   receiving, at a central computing device from an activity database, a series of lists of objects associated with a series of completed collection actions, each of the series of lists of objects including the unmapped object and a plurality of mapped objects;

retrieving, from an object mapping database in response to receiving the series of lists of objects, a series of sets of locations, each set of locations including a location within the defined environment of each of the plurality of mapped objects;

determining, by a processor, based on the series of sets of locations, a plurality of estimated routes traversed through the defined environment to acquire each plurality of mapped objects corresponding to each of the series of lists of objects;

detecting, by the processor, at least one intersection point of the plurality of estimated routes at the geographic location within the defined environment; and identifying, by the processor, one of the at least one intersection points of the plurality of estimated routes as an unmapped object location within the defined environment, wherein the series of lists of objects each indicate an order of collection of the respective list of objects, the determination of the plurality of estimated routes is further based on the order of collection of the plurality of lists of objects, detecting an indication of an incoherent route associated with at least one of the plurality of estimated routes; and excluding the at least one of the plurality of estimated routes associated with the indication of the incoherent route from the detection of the at least one intersection point.

9. The method of claim 8, further comprising associating the unmapped object location with the unmapped object in the object mapping database.

10. The method of claim 8, further comprising:
storing the plurality of estimated routes in a memory of the central computing device;
receiving, at the central computing device, at least one additional list of objects associated with at least one additional completed collection action, the at least one additional list of objects including an unmapped object and a plurality of additional mapped objects;
retrieving, from an object mapping database in response to receiving the at least one additional list of objects, at least one additional set of locations including a location within the defined environment of each of the plurality of additional mapped objects;
determining, by the processor, based on the set of locations, at least one additional estimated route traversed through the defined environment to acquire each of the additional plurality of mapped objects;
detecting, by the processor, at least one updated intersection point of the plurality of estimated routes with the at least one additional estimated route at the geographic location within the defined environment; and
identifying, by the processor, one of the at least one updated intersection points of the plurality of estimated routes as an updated unmapped object location within the defined environment.

11. The method of claim 10, further comprising associating the updated unmapped object location with the unmapped object in the object mapping database.

12. The method of claim 8, wherein the central computing system is coupled to one or more mobile devices, each mobile device including a scanning module and executing an application.

13. The method of claim 12, further comprising:
scanning, via each of the scanning modules of the one or more mobile devices, machine-readable elements encoded with identifiers associated with the objects in a first, second or third list of objects; and
receiving, via each of the applications executed on the one or more mobile devices, decoded identifiers associated with the objects in the first, second or third list of objects.

14. The method of claim 8, wherein the determination of at least one of the plurality of estimated routes is further based on previously recorded sensor data acquired by a plurality of sensors distributed within the defined environment.

15. A system for estimating a geographic location at which an unmapped object is disposed within a defined environment comprising:
an activity database storing a plurality of lists of objects each associated with one of a plurality of completed collection actions, each of the lists of objects including the unmapped object and a plurality of mapped objects;
a mapping database storing a plurality of sets of locations, each set of locations including a location within the defined environment of each of the plurality of mapped objects;
a central computing device having a processor and a memory, the memory including instructions that, when executed by the processor, cause the central computing device to:
retrieve, from the activity database, a first list of objects associated with a first completed collection action, the first list of objects including the unmapped object and a first plurality of mapped objects;
retrieve, from the mapping database, a first set of locations that includes a location within the defined environment of each of the first plurality of mapped objects;
determine, based on the first set of locations, a first estimated route traversed through the defined environment to acquire the first plurality of mapped objects;
retrieve, from the activity database, a second list of objects associated with a second completed collection action, the second list of objects including the unmapped object and a second plurality of mapped objects;
retrieve, from the object mapping database, a second set of locations that includes a location within the defined environment of each of the second plurality of mapped objects;
determine, based on the second set of locations, a second estimated route traversed through the defined environment to acquire the second plurality of mapped objects;
detect at least one intersection point of the first and second estimated routes at the geographic location within the defined environment; and
identify one of the at least one intersection points of the first and second estimated routes as an unmapped object location within the defined environment,
wherein the series of lists of objects each indicate an order of collection of the respective list of objects; and
wherein the determination of the plurality of estimated routes is further based on the order of collection of the plurality of lists of objects,
wherein the first list of objects indicates an order of collection of the first list of objects, the determination of the first estimated route is further based on the order of collection of the first list of objects, the second list of objects indicates an order of collection of the second list of objects, the determination of the second estimated route is further based on the order of collection of the second list of objects, a third list of objects indicates an order of collection of the third list of objects, and the determination of a third estimated route is further based on the order of collection of the third list of objects, wherein the memory further includes instructions that, when executed by the processor, cause the central computing device to:

detect an indication of an incoherent route associated with at least one of the first estimated route, the second estimated route, or the third estimated route; and exclude the at least one of the first estimated route, the second estimated route, or the third estimated route associated with the indication of the incoherent route from the detection of the at least one intersection point.

16. The system of claim 15, wherein the memory further includes instructions that, when executed by the processor, cause the central computing device to:

retrieve, from the activity database, a third list of objects associated with a third completed collection action, the third list of objects including the unmapped object and a third plurality of mapped objects;

retrieve, from the object mapping database, a third set of locations that includes a location within the defined environment of each of the third plurality of mapped objects;

determine based on the third set of locations, a third estimated route traversed through the defined environment to acquire the third plurality of mapped objects;

detect at least one intersection point of the first, second, and third estimated routes at the geographic location within the defined environment;

identify one of the at least one intersection points of the first, second, and third estimated routes as an unmapped object location within the defined environment; and associate the unmapped object location with the unmapped object in the object mapping database.

17. The system of claim 15, further comprising a plurality of sensors distributed within the defined environment, wherein the memory further includes instructions that, when executed by the processor, cause the central computing device to:

receive, from the plurality of sensors distributed within the defined environment, a quantity of previously recorded sensor data, wherein the determination of at least one of the plurality of estimated routes is further based on the previously recorded sensor data.

18. The system of claim 15, further comprising one or more mobile devices coupled to the activity database, each mobile device including a scanning module and executing an application, the one or more mobile devices configured to:

scan, via each of the scanning modules, machine-readable elements encoded with identifiers associated with the objects in the first, second or third list of objects; and receive, via each of the applications executed on the one or more mobile devices, decoded identifiers associated with the objects in the first, second or third list of objects.

* * * * *